(12) United States Patent
Liu et al.

(10) Patent No.: US 11,830,222 B2
(45) Date of Patent: Nov. 28, 2023

(54) BI-LEVEL OPTIMIZATION-BASED INFRARED AND VISIBLE LIGHT FUSION METHOD

(71) Applicant: DALIAN UNIVERSITY OF TECHNOLOGY, Liaoning (CN)

(72) Inventors: Risheng Liu, Liaoning (CN); Xin Fan, Liaoning (CN); Jinyuan Liu, Liaoning (CN); Wei Zhong, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 489 days.

(21) Appl. No.: 17/282,662

(22) PCT Filed: Mar. 5, 2020

(86) PCT No.: PCT/CN2020/077981
§ 371 (c)(1),
(2) Date: Apr. 2, 2021

(87) PCT Pub. No.: WO2021/120408
PCT Pub. Date: Jun. 24, 2021

(65) Prior Publication Data
US 2022/0044442 A1      Feb. 10, 2022

(30) Foreign Application Priority Data

Dec. 17, 2019    (CN) .......................... 201911302904.9

(51) Int. Cl.
*G06K 9/00*      (2022.01)
*G06T 7/80*      (2017.01)
(Continued)

(52) U.S. Cl.
CPC .................. *G06T 7/80* (2017.01); *G06T 5/50* (2013.01); *G06T 7/90* (2017.01);
(Continued)

(58) Field of Classification Search
CPC . G06T 2207/20221; G06T 2207/20212; G06T 5/50; G06T 2207/10024;
(Continued)

(56) References Cited

U.S. PATENT DOCUMENTS

| | | | |
|---|---|---|---|
| 8,755,597 B1 * | 6/2014 | Tantalo | G06T 5/50 |
| | | | 382/284 |
| 2016/0093034 A1 * | 3/2016 | Beck | G06T 5/001 |
| | | | 345/617 |

(Continued)

FOREIGN PATENT DOCUMENTS

| | | |
|---|---|---|
| CN | 104700381 A | 6/2015 |
| CN | 208240087 U | 12/2018 |

(Continued)

*Primary Examiner* — Atiba O Fitzpatrick
(74) *Attorney, Agent, or Firm* — Muncy, Geissler, Olds & Lowe, P.C.

(57) ABSTRACT

The present invention proposes a bi-level optimization-based infrared and visible light fusion method, adopts a pair of infrared camera and visible light camera to acquire images, and relates to the construction of a bi-level paradigm infrared and visible light image fusion algorithm, which is an infrared and visible light fusion algorithm using mathematical modeling. Binocular cameras and NVIDIA TX2 are used to construct a high-performance computing platform and to construct a high-performance solving algorithm to obtain a high-quality infrared and visible light fusion image. The system is easy to construct, and the input data can be acquired by using stereo binocular infrared and visible light cameras respectively; the program is simple and easy to implement; and the fusion image is divided into an image domain and a gradient domain for fusion by means of mathematical modeling according to different imaging principles of infrared and visible light cameras.

5 Claims, 2 Drawing Sheets

(51) Int. Cl.
    *G06T 7/90*         (2017.01)
    *G06T 5/50*         (2006.01)

(52) U.S. Cl.
    CPC ............... *G06T 2207/10024* (2013.01); *G06T 2207/10048* (2013.01); *G06T 2207/20221* (2013.01)

(58) Field of Classification Search
    CPC ............. G06T 7/90; G06T 2207/10048; G06T 3/4076; G06T 2211/424; G06T 2200/21; G06F 18/25; G06F 17/11; G06F 17/12; G06F 17/18; G06F 17/13; G06V 10/143; G06V 20/194; G06V 10/58; H04N 13/254
See application file for complete search history.

(56) References Cited

U.S. PATENT DOCUMENTS

| | | | |
|---|---|---|---|
| 2018/0300906 A1* | 10/2018 | Lu | G06T 11/001 |
| 2020/0357104 A1* | 11/2020 | Luo | G06T 5/001 |
| 2020/0357147 A1* | 11/2020 | Lu | H04N 23/11 |
| 2021/0118111 A1* | 4/2021 | Ti | G06T 5/50 |
| 2022/0172464 A1* | 6/2022 | Ross | G06V 20/10 |
| 2022/0292658 A1* | 9/2022 | Zhang | G06T 5/008 |
| 2022/0377307 A1* | 11/2022 | Shklyar | H04N 23/11 |
| 2022/0392211 A1* | 12/2022 | Johnson | G06V 10/26 |

FOREIGN PATENT DOCUMENTS

| | | |
|---|---|---|
| CN | 109146930 A | 1/2019 |
| CN | 110223262 A | 9/2019 |
| CN | 110363732 A | 10/2019 |

\* cited by examiner

BI-LEVEL OPTIMIZATION-BASED INFRARED AND VISIBLE LIGHT FUSION METHOD

TECHNICAL FIELD

The present invention belongs to the field of image processing and computer vision, adopts a pair of infrared camera and visible light camera to acquire images, and relates to the construction of a bi-level paradigm infrared and visible light image fusion algorithm, which is an infrared and visible light fusion algorithm using mathematical modeling.

BACKGROUND

The binocular stereo vision technology based on visible light band is developed to be relatively mature. Visible light imaging has rich contrast, color and shape information, so the matching information between binocular images can be obtained accurately and quickly so as to obtain scenario depth information. However, visible light band imaging has defects, and the imaging quality thereof is greatly reduced, for example, in strong light, fog rain, snow or night, which affects the matching precision. Therefore, the establishment of a color fusion system by using the complementarity of different band information sources is an effective way to produce more credible images in special environments. For example, a visible light band binocular camera and an infrared band binocular camera are used to constitute a multi-band stereo vision system, and the advantage of not being affected by fog, rain, snow and light of infrared imaging is used to make up for the deficiency of visible light band imaging so as to obtain more complete and precise fusion information.

The multi-modality image fusion technology is an image processing algorithm that uses the complementarity and redundancy between a plurality of images and adopts a specific algorithm or rule for fusion to obtain images with high credibility and better vision. Compared with the singularity of the mono-modality fusion image, multi-modality image fusion can better obtain the interactive information of images in different modalities, and gradually becomes an important means for disaster monitoring, unmanned driving, military monitoring and deep space exploration. The goal is to use the difference and complementarity of imaging of sensors with different modalities to extract the image information of each modality to the greatest extent and use source images of different modalities to fuse a composite image with abundant information and high fidelity. Therefore, the multi-modality image fusion will produce more comprehensive understanding and more accurate positioning of the image. In recent years, most of fusion methods are researched and designed based on the transform domain without considering the multi-scale detail information of images, resulting in the loss of details in the fused image, for example, the public patent CN208240087U, an infrared and visible light fusion system and image fusion device. Therefore, the present invention performs optimization solution after mathematical modeling of infrared and visible light, and realizes the enhancement of details and the removal of artifacts on the basis of retaining the effective information of infrared and visible light images.

SUMMARY

The present invention aims to overcome the defects of the prior art and provide a bi-level paradigm-based infrared and visible light image fusion algorithm. Through the design, bi-level paradigm-based mathematical modeling is carried out on infrared and visible light images, the images are solved in the image domain and the gradient domain, and finally, the real-time performance is achieved through GPU acceleration.

The present invention has the following specific technical solution: A bi-level optimization-based infrared and visible light fusion method, comprises the following steps:

1) Obtaining registered infrared and visible light images, and respectively calibrating each lens and jointly calibrating the respective systems of the visible light binocular camera and the infrared binocular camera;

1-1) Respectively calibrating the infrared camera and the visible light camera by the Zhangzhengyou calibration method to obtain internal parameters including focal length and principal point position and external parameters including rotation and translation of each camera;

1-2) Calculating the positional relationship of the same plane in the visible light image and the infrared image by using RT (rotation matrix and translation vector) obtained by joint calibration and the detected checker corners, and registering the visible light image to the infrared image by using a homography matrix;

2) Converting the color space of the visible light image from an RGB image to an HSV image, extracting the value information of the color image as the input of image fusion, and retaining the original hue and saturation;

2-1) In view of the problem that the visible light image has RGB three channels, converting the RGB color space to the HSV color space, wherein V is value, H is hue and S is saturation; and extracting the value information of the visible light image to be fused with the infrared image, and retaining the hue and saturation, wherein the specific conversion is shown as follows:

$R'=R/255\ G'=G/255\ B'=B/255$ $C\text{max}=\max(R',G',B')$ $C\text{min}=\min(R',G',B')$ $\Delta=C\text{max}-C\text{min}$ $V=C\text{max}$ 2-2) Extracting the V channel as the input of visible light, retaining H and S to the corresponding matrix, and retaining the color information for the subsequent color restoration after fusion.

3) Carrying out bi-level paradigm-based mathematical modeling on the input infrared image and the visible light image with the color space converted; the core of the idea is to establish two separate models, namely the upper-level sub-problem Leader and the lower-level sub-problem Follower to solve the same problem. First, the objective function and the problem constraint in optimization are assumed to be two participants in the game, wherein the objective function is regarded as the Leader and the problem constraint is the Follower. In this kind of competition, the next optimization of the Leader needs to consider the result of the Follower. The two competitors are defined as two composite minimization sub-problems:

$$\text{Leader } (l): \min_F \|F - I\|_2^2 + \gamma \|F - V\|_2^2$$

$$\text{Follower } (f): \text{s.t.} F \in \arg\min_F \|\nabla F - \nabla I\|_1 + \beta \|\nabla F - \nabla V\|_1$$

wherein F represents the fused image, the infrared image and the visible light image are respectively represented by I, V, $\nabla$ represents the operator for obtaining the gradient, and $\gamma$, $\beta$ represent parameters of Leader and Follower respectively;

4) Solving the upper-level sub-problem to obtain the fusion result of the target in the image domain; the target result is obtained by solving the following formula:

$$F_l^{k+1} = \arg\min_F \|F - I\|_2^2 + \gamma \|F - V\|_2^2$$

wherein $F_1^{k-1}$ represents the result of the upper-level problem; and the goal has a simple closed-form solution and thus is directly obtained by the closed-form solution shown as the following formula:

$$F_l^{k+1} = \frac{1 + \gamma V}{1 + \alpha}$$

wherein F represents the fused image, I represents the infrared image, V represents the visible light image, $\gamma$ represents the weight parameter of the visible light and infrared image, and $\alpha$ represents the weight variable parameter.

5) Solving the lower-level sub-problem to obtain the fusion result of the target in the gradient domain; it can be found that the problem is non-convex and non-smooth and difficult to solve directly, the alternating direction multiplier method is used to transform an unconstrained problem into a constrained problem by introducing auxiliary variables, and then the problem is solved under the framework;

The solving method is: first introducing two auxiliary variables u, w, wherein $u = \nabla F - \nabla I$, $w = \nabla F - \nabla V$; and through variable substitution, transforming to minimizing the following problem:

$$\min_{F,u,w} \|u\|_1 + \beta \|w\|_1 + \frac{\rho_1}{2} \left\| \nabla F - \nabla I - u - \frac{\lambda_1}{\rho_1} \right\|_2^2 +$$

$$\frac{\rho_2}{2} \left\| \nabla F - \nabla V - w - \frac{\lambda_2}{\rho_2} \right\|_2^2 + \frac{\tau}{2} \left\| \nabla F - \nabla \hat{F}^k \right\|_2^2$$

wherein $\nabla$ represents the gradient operator, $\lambda_1$, $\lambda_2$ are two multipliers, $\rho_1$, $\rho_2$ are parameters of a penalty term, and three sub-problems respectively about u, w, F are obtained through variable separation:

$$\min_u \|u\|_1 + \frac{\rho_1}{2} \left\| u - \nabla F + \nabla I + \frac{\lambda_1}{\rho_1} \right\|_2^2$$

$$\min_w \beta \|w\|_1 + \frac{\rho_2}{2} \left\| w - \nabla F + \nabla V + \frac{\lambda_2}{\rho_2} \right\|_2^2$$

$$\min_F \frac{\rho_1}{2} \left\| \nabla F - \nabla I - u - \frac{\lambda_1}{\rho_1} \right\|_2^2 + \frac{\rho_2}{2} \left\| \nabla F - \nabla V - w - \frac{\lambda_2}{\rho_2} \right\|_2^2$$

5-1) For the update of $F_f^{k+1}$ of the lower-level problem, the closed-form solution of the formula is used to obtain:

$$F_f^{k+1} = \frac{\rho_1 \nabla^T \left( \nabla I + u + \frac{\lambda_1}{\rho_1} \right) + \rho_2 \nabla^T \left( \nabla V + w + \frac{\lambda_2}{\rho_2} \right) + I * \nabla \hat{F}^k}{\rho_1 \nabla^T \nabla + \rho_2 \nabla^T \nabla + I * \nabla^T \nabla}$$

5-2) The multipliers $\lambda_1$, $\lambda_2$ need updating after each iteration, and the specific update mode is as follows:

$$\lambda_1^{k+1} = \lambda_1^k - \rho_1(\nabla F - \nabla V - w)$$

$$\lambda_2^{k+1} = \lambda_2^k - \rho_2(\nabla F - \nabla I - u)$$

6) Obtaining two estimates $F_1^{k+1}$, $F_f^{k+1}$ of the fusion result under different characteristics by solving the upper-level and lower-lever sub-problems, and to fuse the two components into an image F, linearly combining the two components, which is expressed as the following form:

$$F^{k+1} = \alpha^k F_l^{k+1} + (1 - \alpha^k) F_f^{k+1}$$

wherein $F^{k+1}$ is the final result of each iteration, and $\alpha$ is a parameter weighing the two components and is manually selected based on experience.

7) Converting the color space: converting the fusion image back to the RGB image, and adding the hue and saturation previously retained;

Restoring to the RGB color space from the HSV color space by updating the V information saved into the fusion image in combination with the previously retained H and S, wherein the specific formulas are shown as follows:

$$C = V \times S$$

$$X = C \times (1 - |(H/60°) \bmod 2 - 1|)$$

$$m = V - C$$

$$(R', G', B') = \begin{cases} (C, X, 0), & 0° \leq H < 60° \\ (X, C, 0), & 60° \leq H < 120° \\ (0, C, X), & 120° \leq H < 180° \\ (0, X, C), & 180° \leq H < 240° \\ (X, 0, C), & 240° \leq H < 300° \\ (C, 0, X), & 300° \leq H < 360° \end{cases}$$

$$R', G', B' = ((R' + m) \times 255, (G' + m) \times 255, (B' + m) \times 255)$$

wherein C is the product of the value and the saturation; and in is the difference of the value and C.

8) Enhancing the color: enhancing the color of the fusion image to generate a fusion image with higher resolution and contrast; and performing pixel-level image enhancement for the contrast of each pixel.

Performing color correction and enhancement on the restored image to generate a three-channel image that is consistent with observation and detection; and performing color enhancement on the R channel, G channel and B channel respectively to obtain the final fusion image. The specific formulas are shown as follows:

$$R_{out} = (R_{in})^{1/gamma}$$

$$R_{display} = (R_{in}^{(1/gamma)})^{gamma}$$

$$G_{out} = (G_{in})^{1/gamma}$$

$$G = (G_{in}^{(1/gamma)})^{gamma}$$

$$B_{out}=(B_{in})^{1/gamma}$$

$$B_{display}=(B_{in}^{(1/gamma)})^{gamma}$$

wherein gamma is the correction parameter, $R_{in}$, $G_{in}$ and $B_{in}$ are the values of the three input channels R, G, and B respectively, $R_{out}$, $G_{out}$ and $B_{out}$ are the intermediate parameters, and $R_{display}$, $G_{display}$ and $B_{display}$ are the values of the three channels after enhancement.

The present invention has the following beneficial effects:

The present invention proposes a real-time fusion method using infrared and visible light binocular stereo cameras. Paradigm-based mathematical modeling is carried out on the input infrared and visible light images by means of mathematical modeling, and the images are solved and fused in the image domain and the gradient domain respectively, effectively reducing the interference of artifacts and fusing a highly reliable image. The present invention has the following characteristics:

(1) The system is easy to construct, and the input data can be acquired by using stereo binocular cameras;

(2) The program is simple and easy to implement;

(3) The fusion is divided into two parts and specifically solved by means of mathematical modeling;

(4) The structure is complete, multi-thread operation can be performed, and the program is robust;

(5) The detail images are used to perform significant enhancement and differentiation to improve the generalization ability of the algorithm.

DETAILED DESCRIPTION

Figure 1:
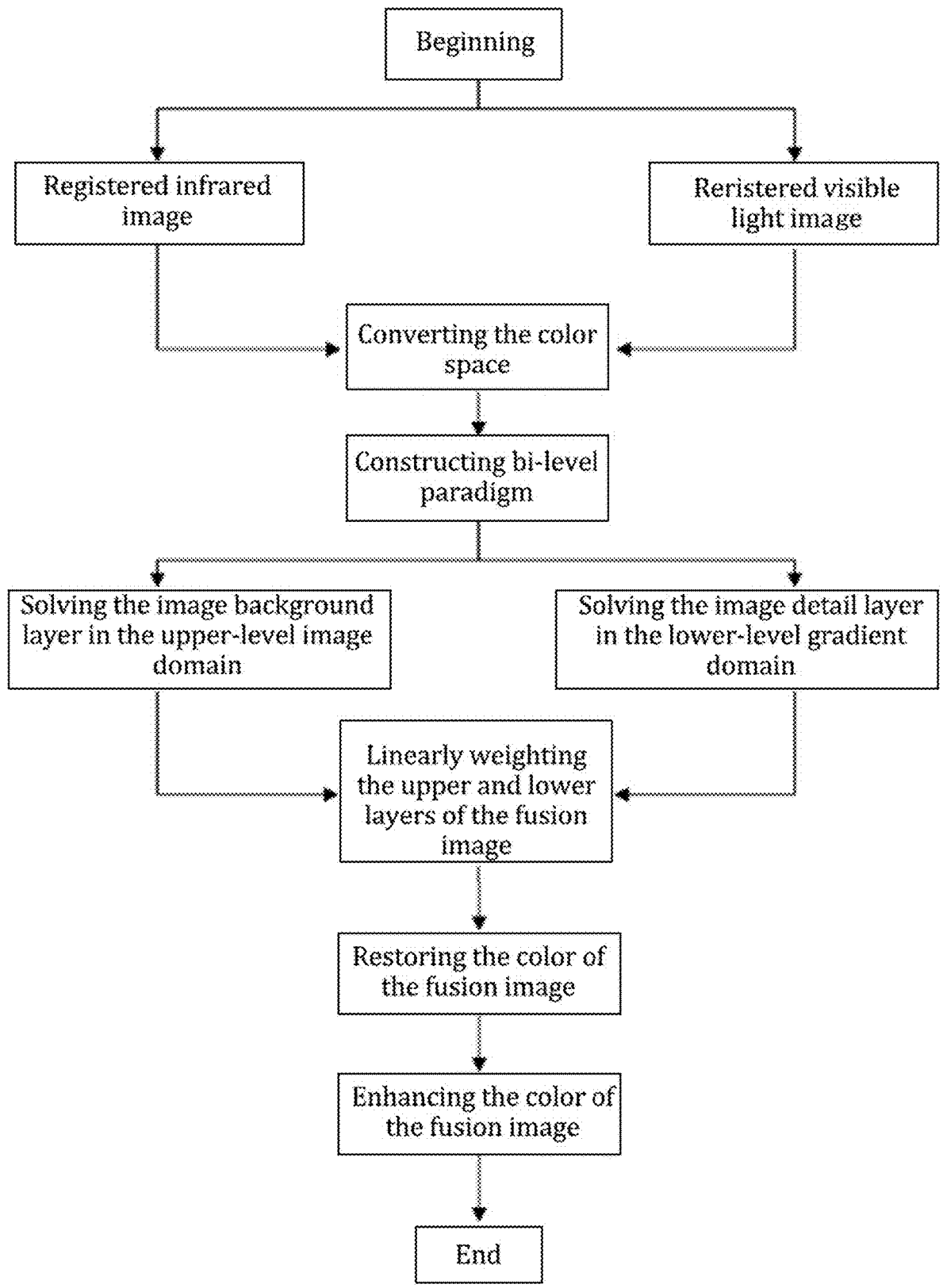
FIG. 1 is a flow chart of a visible light and infrared fusion algorithm.
Figure 2:
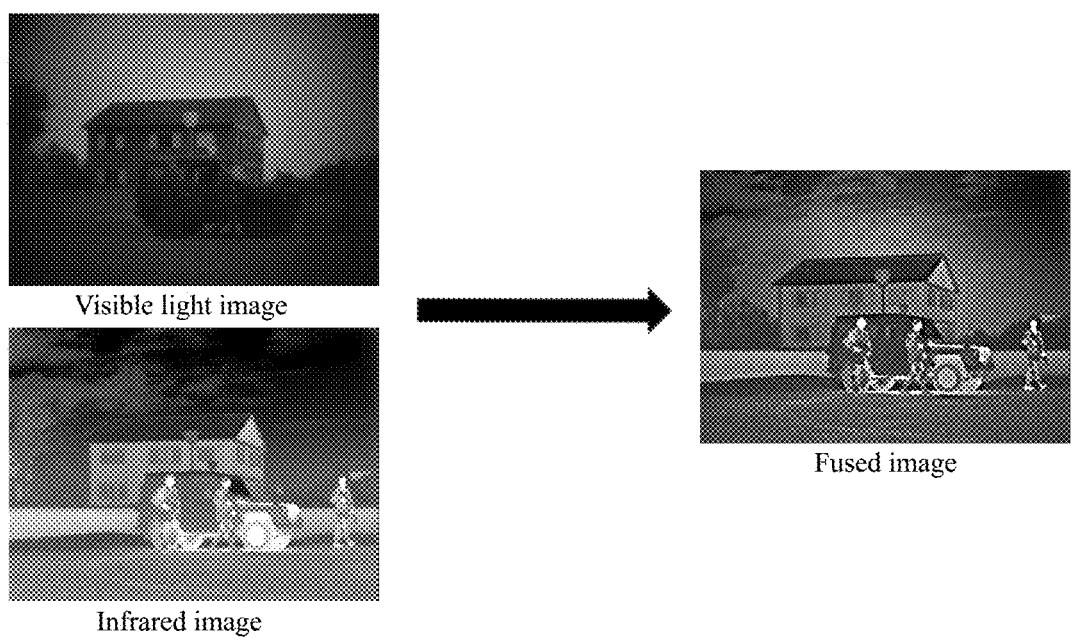
FIG. 2 is a final fusion image.

The present invention proposes a method for real-time image fusion by an infrared camera and a visible light camera, and will be described in detail below in combination with drawings and embodiments.

The binocular stereo cameras are placed on a fixed platform, the image resolution of the experiment cameras is 1280×720, and the field of view is 45.4°. To ensure real-time performance, NVIDIA TX2 is used for calculation. On this basis, a real-time infrared and visible light fusion method is designed, and the method comprises the following steps:

1) Obtaining registered infrared and visible light images;

1-1) Respectively calibrating each lens and jointly calibrating the respective systems of the visible light binocular camera and the infrared binocular camera;

1-2) Respectively calibrating the infrared camera and the visible light camera by the Zhangzhengyou calibration method to obtain internal parameters such as focal length and principal point position and external parameters such as rotation and translation of each camera.

1-3) Calculating the positional relationship of the same plane in the visible light image and the infrared image by using RT obtained by joint calibration and the detected checker corners, and registering the visible light image to the infrared image by using a homography matrix.

2) Converting the color space of the image 2-1) In view of the problem that the visible light image has RGB three channels, converting the RGB color space to the HSV color space, extracting the V (value) information of the visible light image to be fused with the infrared image, and retaining H (hue) and S (saturation), wherein the specific conversion is shown as follows:

$$R'=R/255 \quad G'=G/255 \quad B'=B/255$$

$$Cmax=max(R',G',B')$$

$$Cmin=min(R',G',B')$$

$$\Delta=Cmax-Cmin$$

$$V=Cmax$$

2-2) Extracting the V (value) channel as the input of visible light, retaining H (hue) and S (saturation) to the corresponding matrix, and retaining the color information for the subsequent color restoration after fusion.

3) Carrying out bi-level paradigm-based mathematical modeling for the input infrared image and the visible light image with the color space converted. The core of the idea is to establish two separate models, namely the upper-level sub-problem Leader and the lower-level sub-problem Follower to solve the same problem. First, the objective function and the problem constraint in optimization are assumed to be two participants in the game, wherein the objective function is regarded as the Leader and the problem constraint is the Follower. In this kind of competition, the next optimization of the Leader needs to consider the result of the Follower. The two competitors are defined as two composite minimization sub-problems:

$$\text{Leader } (l): \min_F \|F-I\|_2^2 + \gamma\|F-V\|_2^2$$

$$\text{Follower } (f): \text{s.t.} F \in \operatorname*{argmin}_F \|\nabla F - \nabla I\|_1 + \beta\|\nabla F - \nabla V\|_1$$

wherein F represents the fused image, and the infrared image and the visible light image are respectively represented by I, V, $\nabla$ represents the operator for obtaining the gradient, and $\gamma$, $\beta$ represent parameters of Leader and Follower respectively.

4) Solving the upper-level sub-problem; the target result can be obtained by solving the following formula:

$$F_1^{k+1} = \operatorname*{argmin}_F \|F-I\|_2^2 + \gamma\|F-V\|_2^2$$

wherein $F_1^{k-1}$ represents the result of the upper-level problem. The goal has a simple closed-form solution and thus can be directly obtained by the closed-form solution shown as the following formula:

$$F_1^{k+1} = \frac{1+\gamma V}{1+\alpha}$$

5) Solving the lower-level sub-problem; it can be found that the problem is non-convex and non-smooth and difficult to solve directly and is solved by the alternating direction multiplier method widely used. Therefore, it is necessary to transform an unconstrained problem into a constrained problem by introducing auxiliary variables, and then the problem is solved under the framework. Specifically, first introducing two auxiliary variables u, w, wherein $u=\nabla F-\nabla I$, $w=\nabla F-\nabla V$.

Through variable substitution, transforming to minimizing the following problem:

$$\min_{F,u,w} \|u\|_1 + \beta\|w\|_1 + \frac{\rho_1}{2}\left\|\nabla F - \nabla I - u - \frac{\lambda_1}{\rho_1}\right\|_2^2 +$$

$$\frac{\rho_2}{2}\left\|\nabla F - \nabla V - w - \frac{\lambda_2}{\rho_2}\right\|_2^2 + \frac{\tau}{2}\left\|\nabla F - \nabla \hat{F}^k\right\|_2^2$$

wherein $\nabla$ represents the gradient operator, $\lambda_1$, $\lambda_2$ are two multipliers, $\rho_1$, $\rho_2$ are parameters of a penalty term, and three sub-problems respectively about u, w, F are obtained through variable separation:

$$\min_u \|u\|_1 + \frac{\rho_1}{2}\left\|u - \nabla F + \nabla I + \frac{\lambda_1}{\rho_1}\right\|_2^2$$

$$\min_w \beta\|w\|_1 + \frac{\rho_2}{2}\left\|w - \nabla F + \nabla V + \frac{\lambda_2}{\rho_2}\right\|_2^2$$

$$\min_F \frac{\rho_1}{2}\left\|\nabla F - \nabla I - u - \frac{\lambda_1}{\rho_1}\right\|_2^2 + \frac{\rho_2}{2}\left\|\nabla F - \nabla V - w - \frac{\lambda_2}{\rho_2}\right\|_2^2$$

5-1) For the update of $F_f^{k+1}$ of the lower-level problem, the closed-form solution of the formula is used to obtain:

$$F_f^{k+1} = \frac{\rho_1 \nabla^T\left(\nabla I + u + \frac{\lambda_1}{\rho_1}\right) + \rho_2 \nabla^T\left(\nabla V + w + \frac{\lambda_2}{\rho_2}\right) + I * \nabla \hat{F}^k}{\rho_1 \nabla^T \nabla + \rho_2 \nabla^T \nabla + I * \nabla^T \nabla}$$

5-2) The multipliers $\lambda_1$, $\lambda_2$ need updating after each iteration, and the specific update mode is as follows:

$$\lambda_1^{k+1} = \lambda_1^k - \rho_1(\nabla F - \nabla V - w)$$

$$\lambda_2^{k+1} = \lambda_2^k - \rho_2(\nabla F - \nabla I - u)$$

6) Obtaining two estimates $F_l^{k+1}$, $F_f^{k+1}$ of the fusion result under different characteristics by solving the upper-level and lower-lever sub-problems, and to fuse the two components into an image F, linearly combining the two components, which is expressed as the following form:

$$F^{k+1} = \alpha^k F_l^{k+1} + (1-\alpha^k) F_f^{k+1}$$

wherein F is the final result of each iteration, and α is a parameter weighing the two components. The parameter needs to be manually selected based on experience, and is selected as 0.5 herein.

7-1) Restoring to the RGB color space from the HSV color space by updating the V (value) information saved into the fusion image in combination with the previously retained H (hue) and S (saturation), wherein the specific formulas are shown as follows:

$$C = V \times S$$

$$X = C \times (1 - |(H/60°)\mod 2 - 1|)$$

$$m = V - C$$

$$(R', G', B') = \begin{cases} (C, X, 0) & 0° \le H < 60° \\ (X, C, 0) & 60° \le H < 120° \\ (0, C, X) & 120° \le H < 180° \\ (0, X, C) & 180° \le H < 240° \\ (X, 0, C) & 240° \le H < 300° \\ (C, 0, X) & 300° \le H < 360° \end{cases}$$

$$R', G', B' = ((R'+m) \times 255, (G'+m) \times 255, (B'+m) \times 255)$$

wherein C is the product of the value and the saturation; and in is the difference of the value and C.

7-2) performing color correction and enhancement on the image restored in step 7-1 to generate a three-channel image that is consistent with observation and detection; and performing color enhancement on the R channel, G channel and B channel respectively, wherein the specific formulas are shown as follows:

$$R_{out} = (R_{in})^{1/gamma}$$

$$R_{display} = (R_{in}^{(1/gamma)})^{gamma}$$

$$G_{out} = (G_{in})^{1/gamma}$$

$$G = (G_{in}^{(1/gamma)})^{gamma}$$

$$B_{out} = (B_{in})^{1/gamma}$$

$$B_{display} = (B_{in}^{(1/gamma)})^{gamma}$$

wherein gamma is the correction parameter, $R_{in}$, $G_{in}$ and $B_{in}$ are the values of the three input channels R, G, and B respectively, $R_{out}$, $G_{out}$ and $B_{out}$ are the intermediate parameters, and $R_{display}$, $G_{display}$ and $B_{display}$ are the values of the three channels after enhancement.

The invention claimed is:

1. A bi-level optimization-based infrared and visible light fusion method, wherein the method comprises the following steps:

1) obtaining registered infrared and visible light images, and respectively calibrating each lens and jointly calibrating the respective systems of the visible light binocular camera and the infrared binocular camera;

1-1) respectively calibrating the infrared camera and the visible light camera by the Zhangzhengyou calibration method to obtain internal parameters including focal length and principal point position and external parameters including rotation and translation of each camera;

1-2) calculating the positional relationship of the same plane in the visible light image and the infrared image by using RT obtained by joint calibration and the detected checker corners, and registering the visible light image to the infrared image by using a homography matrix;

2) converting the color space of the visible light image from an RGB image to an HSV image, extracting the value information of the color image as the input of image fusion, and retaining the original hue and saturation;

3) carrying out bi-level paradigm-based mathematical modeling on the input infrared image and the visible light image with the color space converted; establishing two separate models, namely the upper-level sub-problem Leader and the lower-level sub-problem Follower to solve the same problem.

$$\text{Leader } (l): \min_F \|F - I\|_2^2 + \gamma\|F - V\|_2^2$$

$$\text{Follower } (f): \text{s.t.} F \in \operatorname*{argmin}_F \|\nabla F - \nabla I\|_1 + \beta\|\nabla F - \nabla V\|_1$$

wherein F represents the fused image, the infrared image and the visible light image are respectively represented by I, V, $\nabla$ represents the operator for obtaining the gradient, and γ, β represent parameters of Leader and Follower respectively;

4) solving the upper-level sub-problem to obtain the fusion result of the target in the image domain; the target result is obtained by solving the following formula:

$$F_1^{k+1} = \underset{F}{\operatorname{argmin}} \|F - I\|_2^2 + \gamma \|F - V\|_2^2$$

wherein $F_1^{k+1}$ represents the result of the upper-level problem; and the goal has a simple closed-form solution and thus is directly obtained by the closed-form solution shown as the following formula:

$$F_1^{k+1} = \frac{1 + \gamma V}{1 + \alpha}$$

wherein F represents the fused image, I represents the infrared image, V represents the visible light image, $\gamma$ represents the weight parameter of the visible light and infrared image, and $\alpha$ represents the weight variable parameter;

5) solving the lower-level sub-problem to obtain the fusion result of the target in the gradient domain; and using the alternating direction multiplier method to transform an unconstrained problem into a constrained problem by introducing auxiliary variables, and then solving the problem under the framework;

6) obtaining two estimates $F_1^{k+1}$, $F_f^{k+1}$ of the fusion result under different characteristics by solving the upper-level and lower-lever sub-problems, and to fuse the two components into an image F, linearly combining the two components, which is expressed as the following form:

$$F^{k+1} = \alpha^k F_l^{k+1} + (1-\alpha^k) F_f^{k+1}$$

wherein $F^{k+1}$ is the final result of each iteration and is manually selected based on experience;

7) converting the color space: converting the fusion image back to the RGB image, and adding the hue and saturation previously retained;

restoring to the RGB color space from the HSV color space by updating the V information saved into the fusion image in combination with the previously retained H and S;

8) enhancing the color: enhancing the color of the fusion image to generate a fusion image with higher resolution and contrast; and performing pixel-level image enhancement for the contrast of each pixel;

performing color correction and enhancement on the restored image to generate a three-channel image that is consistent with observation and detection; and performing color enhancement on the R channel, G channel and B channel respectively to obtain the final fusion image.

2. The bi-level optimization-based infrared and visible light fusion method according to claim 1, wherein the color space conversion of the visible light image in step 2) comprises:

2-1) converting the RGB color space to the HSV color space, wherein V is value, H is hue and S is saturation; and extracting the value information of the visible light image to be fused with the infrared image, and retaining the hue and saturation, wherein the specific conversion is shown as follows:

R'=R/255 G'=G/255 B'=B/255

Cmax=max(R',G',B')

Cmin=min(R',G',B')

Δ=Cmax−Cmin

V=Cmax 2-2) extracting the V channel as the input of visible light, retaining H and S to the corresponding matrix, and retaining the color information for the subsequent color restoration after fusion.

3. The bi-level optimization-based infrared and visible light fusion method according to claim 1, wherein the solving method in step 5): first introducing two auxiliary variables u, w, wherein u=∇F−∇I, w=∇F−∇V; and through variable substitution, transforming to minimizing the following problem:

$$\min_{F,u,w} \|u\|_1 + \beta \|w\|_1 + \frac{\rho_1}{2} \left\| \nabla F - \nabla I - u - \frac{\lambda_1}{\rho_1} \right\|_2^2 +$$

$$\frac{\rho_2}{2} \left\| \nabla F - \nabla V - w - \frac{\lambda_2}{\rho_2} \right\|_2^2 + \frac{\tau}{2} \left\| \nabla F - \nabla \hat{F}^k \right\|_2^2$$

wherein ∇ represents the gradient operator, $\lambda_1$, $\lambda_2$ are two multipliers, $\rho_1$, $\rho_2$ are parameters of a penalty term, and three sub-problems respectively about u, w, F are obtained through variable separation:

$$\min_u \|u\|_1 + \frac{\rho_1}{2} \left\| u - \nabla F + \nabla I + \frac{\lambda_1}{\rho_1} \right\|_2^2$$

$$\min_w \beta \|w\|_1 + \frac{\rho_2}{2} \left\| w - \nabla F + \nabla V + \frac{\lambda_2}{\rho_2} \right\|_2^2$$

$$\min_F \frac{\rho_1}{2} \left\| \nabla F - \nabla I - u - \frac{\lambda_1}{\rho_1} \right\|_2^2 + \frac{\rho_2}{2} \left\| \nabla F - \nabla V - w - \frac{\lambda_2}{\rho_2} \right\|_2^2$$

5-1) for the update of $F_f^{k+1}$ of the lower-level problem, the closed-form solution of the formula is used to obtain:

$$F_f^{k+1} = \frac{\rho_1 \nabla^T \left( \nabla I + u + \frac{\lambda_1}{\rho_1} \right) + \rho_2 \nabla^T \left( \nabla V + w + \frac{\lambda_2}{\rho_2} \right) + I * \nabla \hat{F}^k}{\rho_1 \nabla^T \nabla + \rho_2 \nabla^T \nabla + I * \nabla^T \nabla}$$

5-2) the multipliers $\lambda_1$, $\lambda_2$ need updating after each iteration, and the specific update mode is as follows:

$$\lambda_1^{k+1} = \lambda_1^k - \rho_1(\nabla F - \nabla V - w)$$

$$\lambda_2^{k+1} = \lambda_2^k - \rho_2(\nabla F - \nabla I - u).$$

4. The bi-level optimization-based infrared and visible light fusion method according to claim 1, wherein the specific formulas for color space conversion in step 7) are shown as follows:

$$C = V \times S$$

$$X = C \times (1 - |(H/60°) \bmod 2 - 1|)$$

$$m = V - C$$

$$(R', G', B') = \begin{cases} (C, X, 0) & 0° \leq H < 60° \\ (X, C, 0) & 60° \leq H < 120° \\ (0, C, X) & 120° \leq H < 180° \\ (0, X, C) & 180° \leq H < 240° \\ (X, 0, C) & 240° \leq H < 300° \\ (C, 0, X) & 300° \leq H < 360° \end{cases}$$

$$R', G', B' = ((R'+m) \times 255, (G'+m) \times 255, (B'+m) \times 255)$$

wherein C is the product of the value and the saturation; and in is the difference of the value and C.

5. The bi-level optimization-based infrared and visible light fusion method according to claim 1, wherein the specific formulas for color enhancement in step 8) are shown as follows:

$$R_{out} = (R_{in})^{1/gamma}$$

$$R_{display} = (R_{in}^{(1/gamma)})^{gamma}$$

$$G_{out} = (G_{in})^{1/gamma}$$

$$G = (G_{in}^{(1/gamma)})gamma$$

$$B_{out} = (B_{in})^{1/gamma}$$

$$B_{display} = (B_{in}^{(1/gamma)})^{gamma}$$

wherein gamma is the correction parameter, $R_{in}$, $G_{in}$ and $B_{in}$ are the values of the three input channels R, G, and B respectively, $R_{out}$, $G_{out}$ and $B_{out}$ are the intermediate parameters, and $R_{display}$, $G_{display}$ and $B_{display}$ are the values of the three channels after enhancement.

* * * * *